United States Patent [19]
Kylberg

[11] 3,974,718
[45] Aug. 17, 1976

[54] EPICYCLIC GEAR TORQUE ABSORBING PINION CARRIER

[75] Inventor: Gunnar Kylberg, Bromma, Sweden

[73] Assignee: Stal-Laval Turbin AB, Finspong, Sweden

[22] Filed: Feb. 25, 1974

[21] Appl. No.: 445,535

[30] Foreign Application Priority Data
Mar. 1, 1973  Sweden .............................. 7302867

[52] U.S. Cl. ............................... 74/750 R; 74/801; 74/410
[51] Int. Cl.² ...................... F16H 3/44; F16H 1/28; F16H 57/00
[58] Field of Search ................. 74/750 R, 773, 785, 74/801, 410, 443

[56] References Cited
UNITED STATES PATENTS

| | | |
|---|---|---|
| 2,460,629 | 3/1945 | Fawick .................................. 74/801 |
| 3,016,757 | 1/1962 | Kornylak .......................... 74/443 X |
| 3,090,258 | 5/1963 | Zink et al. ............................. 74/801 |
| 3,218,889 | 11/1965 | Jarchow ................................ 74/801 |
| 3,274,980 | 9/1966 | Abermeth ........................ 74/801 X |
| 3,355,955 | 12/1967 | Aller .............................. 74/750 R X |
| 3,511,114 | 5/1970 | Schnepel ............................... 74/801 |
| 3,513,724 | 5/1970 | Box .................................. 74/750 R |
| 3,527,121 | 9/1970 | Moore .............................. 74/801 X |

FOREIGN PATENTS OR APPLICATIONS

| | | |
|---|---|---|
| 660,901 | 12/1927 | France .................................. 74/785 |
| 963,414 | 7/1950 | France .................................. 74/801 |
| 338,777 | 11/1930 | United Kingdom ................... 74/773 |

*Primary Examiner*—Samuel Scott
*Assistant Examiner*—Lance W. Chandler
*Attorney, Agent, or Firm*—Eric Y. Munson

[57] ABSTRACT

A torque absorbing carrier for the pinions in an epicyclic gear train which comprises a pair of flanges between which the pinions are mounted to mesh with the sun wheel and the internal gear ring.

When the pinions function as planetary gear wheels, one of the flanges operates to transmit the torque moment and is connected to a drive shaft; when the pinions function as star gear wheels, the other flange operates to transmit the torque moment and is firmly anchored in the gear housing. The pinions are pivoted on shaft pins which are resiliently mounted in the torque transmitting flange and fixedly mounted in the other flange to prevent angular motion of the pinions and to maintain the parallel axial alignment between the pinion shafts, the sun wheel shaft and the internal gear ring.

2 Claims, 3 Drawing Figures

EPICYCLIC GEAR TORQUE ABSORBING PINION CARRIER

BACKGROUND OF THE INVENTION

Epicyclic gear trains, which are also commonly referred to as planetary or star gear, have particular application where a minimum of space is a factor. Therefore, the dimensions of the carrier for the planet wheels or the star wheels must be carefully considered with respect to the relatively small space within which the various parts of the gear train are housed, without sacrificing their ability to sustain the stress under the torsional forces to which they are subjected during their operation. Epicyclic gear systems require precision for smooth and efficient operation, and unless provision is made to counteract the angular distorting forces, their use becomes limited.

As an example, epicyclic gear trains are used in turbine powered vessels and other vehicles to reduce the high engine speed of the turbines. In such case the sun wheel is connected to the turbine, while the internal gear ring is connected to the propeller shaft, generally through another gear. In these turbines, which include substantially wide gear wheels and consequently relatively long shaft pins, deformation and bending of these shafts often occur, which in turn will cause the pinions to become obliquely loaded while engaging the sun wheel and the internal gear ring, with consequent uneven wear.

SUMMARY OF THE INVENTION

The present invention purports to solve the aforementioned problems by mounting the pinions between a pair of spaced flanges, one of which serves to transmit the torque moment. This objective is obtained by mounting the shaft pins of the pinions resiliently on the torque transmitting flange and firmly fixed to the other flange.

When the pinions function as planetary gear wheels, the torque moment is transmitted by the flange connected to the output shaft and to which flange the pinion shaft pins are resiliently connected while being fixedly connected to the other flange. On the other hand, when the pinions function as star wheels, their shaft pins are resiliently connected to the flange which is anchored to the gear housing and connected fixedly to the other flange. In the latter case, the flange anchored to the gear housing is the torque transmitting flange.

The two flanges are rigidly interconnected by means of beams or rigid spacing members. Nevertheless, no matter how rigidly the two flanges are interconnected, it has been found that without the arrangement of the pinion shaft pins are described herein, deformation and axial distortion of the shaft pins cannot be avoided. This axial distortion of the pins causes the pinions to be squeezed between the other parts of the gear train.

The arrangement according to the invention ensures the axial alignment of the shaft pins.

DESCRIPTION OF PREFERRED EMBODIMENT

Figure 1:
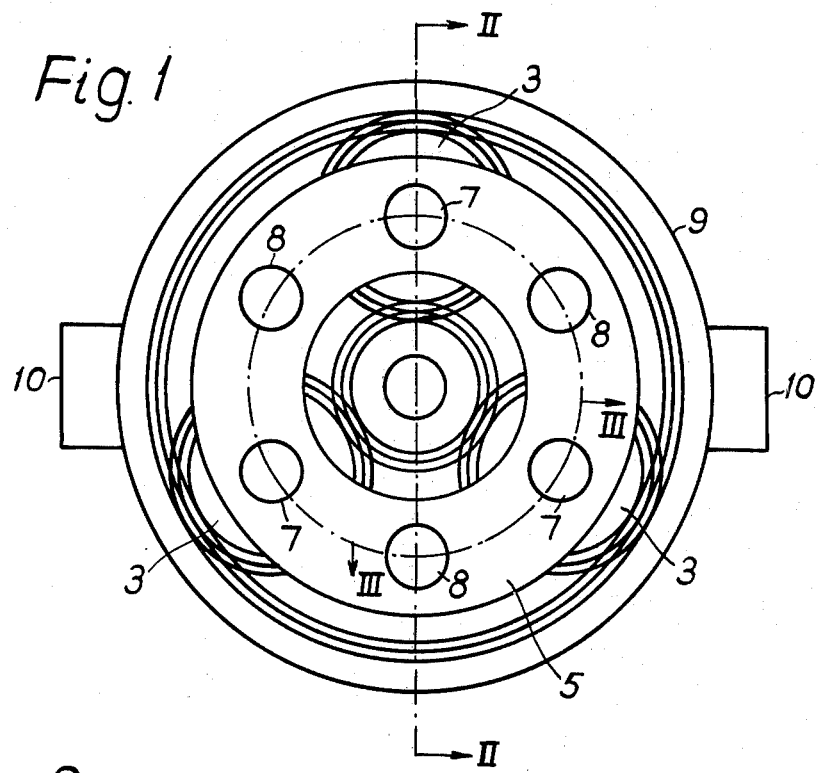
FIG. 1 is an elevational view, seen in an axial direction, of an epicyclic gear train embodying the invention.
Figure 2:
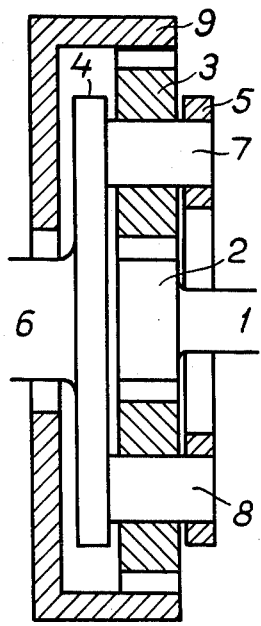
FIG. 2 is an axial section taken along the line II—II of FIG. 1.

FIGS. 1 and 2 show an epicyclic gear, more specifically a planetary gear having a sun-wheel shaft 1, a sun-wheel 2 and planet gear-wheels 3 which are mounted between the flanges 4 and 5 of the planet-wheel carrier. The torque-transmitting flange 4 is arranged on the output shaft 6. The planet-wheels are mounted on shaft pins 7 which are connected to the flanges 4 and 5. These flanges are rigidly interconnected by means of beams 8, which are shown here as fixed pins which are bored into the flanges 4 and 5. However, flanges 4, 5 and beams 8 may be formed as a one piece unit with recesses and bores for planetary gear wheels 3 and shaft pins 7, respectively. The planet gear-wheels can be firmly connected to their shaft pins which are then mounted in the flanges, or the shaft pins may be firmly connected to the flanges whereas the planet gear-wheels rotate about the pins. The gear is surrounded by an internally toothed gear ring 9 which, in the embodiment shown, is assumed to be mounted by means of brackets 10 in the gear housing (not shown). Conceivably the shaft 6 may be formed as a hollow shaft surrounding the sun-wheel shaft 1, in which case, the flange 5 then becomes the torque transmitting flange.

When the pinions function as a star gear, the flange 5 is firmly mounted in the gear housing, whereas the output shaft 6 is connected to the internal gear ring 9 which rotates about the stationary star-wheels 3. Also in this case the flange 5 transmits the torque moment.

Figure 3:
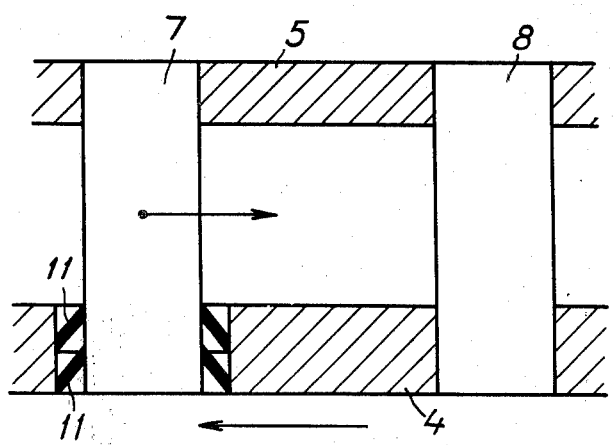
FIG. 3 is a fragmentary section drawn to an enlarged scale, taken along the portion III—III of the pitch circle of the shaft pins showing their attachment to the two flanges.

FIG. 3 shows a portion of a section III—III along the pitch circle of the shaft pins 7 and the beams 8 in FIG. 1, the flange 4 being the torque-transmitting flange as in FIGS. 1 and 2. As mentioned, the beams 8 are rigidly attached to both flanges 4 and 5 and the shaft pins 7 are fixedly attached to the flange 5. On the other hand, according to the invention, the shaft pins are resiliently connected to the torque-transmitting flange 4, which connection may comprise conical spring washers 11, as shown in FIG. 3. Conceivably, the shaft pins may be molded to the flange 4 by means of a relatively hard but yielding plastic or some other semi-hard molding compound.

The reason for this as well as the principle of operation will be better understood if, for example, it is assumed that the shaft pins 7 are also firmly attached to the flange 4, and the flange 4 is subjected to a torque moment in the direction indicated by the lower arrow. The shaft pin 7 will then be affected by a force indicated by the upper arrow, which force tends to bend the shaft pin to the right, thus causing the flange 4 to twist about its center line. This twisting force is counteracted by the beams 8, but no matter how sturdy these and the other parts of the construction may be, some degree of deformation will always occur. As mentioned herein, the planet-wheel carrier cannot, for reasons of space, be made of unlimited thickness, and if the gear is designed for great torque mements with relatively big gear wheels and consequently relatively long shaft pins and beams, for example as in a gear for ship turbines, some deformation of the shaft pins cannot be avoided. This will cause a distortion of the planet gear-wheels, which will then be obliquely loaded when meshing with the sun-wheel 3 and the internal gear ring 9, thus resulting in an uneven wear.

This is avoided according to the invention by mounting the shaft pins resiliently in the torque-transmitting flange 4, thus causing both ends of the shaft pins to yield to the torque forces. If the resilience in the washers 11, or some corresponding resilient attachment, has the same load characteristics as the resilience of the beams 8, the shaft pins, when loaded, will always be parallel to the main shaft of the gear regardless of the magnitude of the load. In the two above-mentioned cases in which the flange 5 is torque-transmitting flange, the shafts 7 are to be resiliently connected to flange 5 and fixedly attached to 4.

What is claimed is:

1. A torque absorbing carrier for the pinions which mesh with the sun-wheel and the internal gear ring to drive the co-axial shafts in an epicyclic gear train mounted within a housing comprising:
    a. two spaced paralleled flanges between which said pinions and said sun-wheel are operationally mounted;
    b. beams extending between said flanges for rigidly interconnecting the same;
    c. shaft pins supporting said pinions between said flanges in meshing relationship with the sun-wheel and the internal gear ring;
    d. one of said flanges being effective to transmit the torque moment produced by the co-axial shafts;
    e. said shaft pins being resiliently mounted in said torque transmitting flange while being fixedly connected to the other one of said flanges thereby reducing deformation and axial distortion of the pinion shaft pins when subjected to the torque moment; and
    f. the shaft pin resilient mounting possessing the same load characteristics as the resilience of the beams whereby the shaft pins, when subjected to the torque moment, remain parallel to the co-axial shafts of the gear train regardless of the magnitude of the load resulting in the torque moment.

2. A torque absorbing carrier according to claim 1, in which said shaft pins are inserted into a bore in the torque transmitting flange and resiliently retained therein by conical spring washers.

* * * * *